(No Model.) 3 Sheets—Sheet 1.

A. WARENSKJOLD & J. G. BURGESS.
RUNNING GEAR.

No. 496,712. Patented May 2, 1893.

WITNESSES:
Chas. Nida
C. Sedgwick

INVENTORS.
A. Warenskjold
J. G. Burgess
BY Munn & Co
ATTORNEYS (No Model.) 3 Sheets—Sheet 2.
A. WARENSKJOLD & J. G. BURGESS.
RUNNING GEAR.
No. 496,712. Patented May 2, 1893.
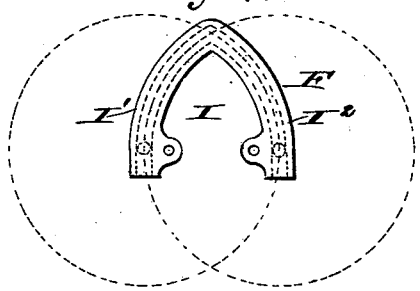
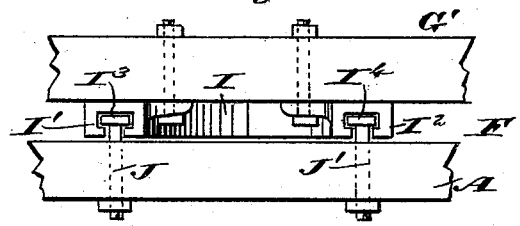
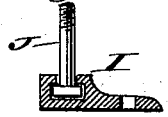
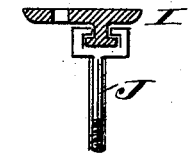
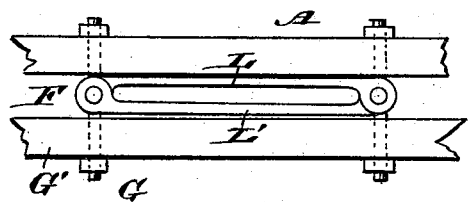
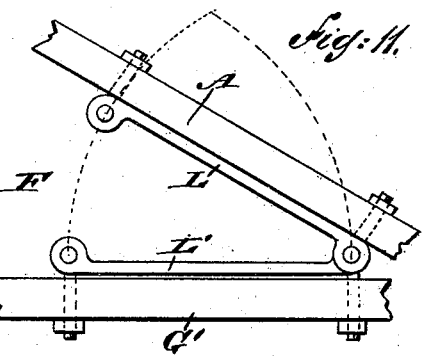
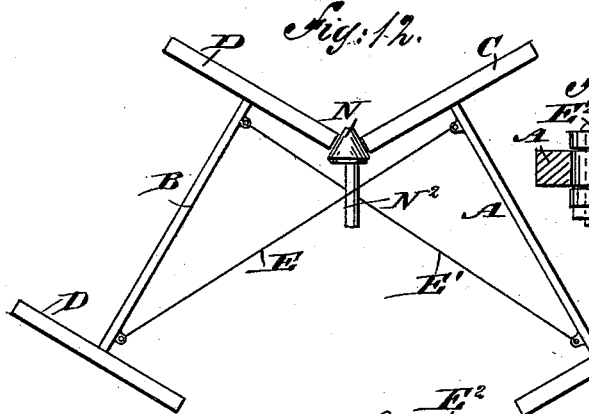
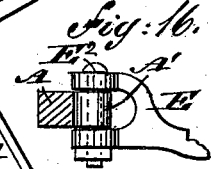
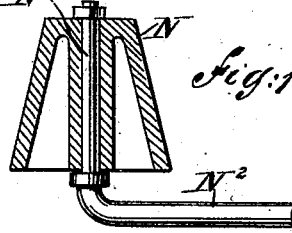
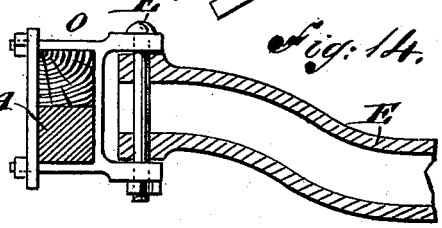
WITNESSES:
INVENTORS
A. Warenskjold
J. G. Burgess
BY Munn & Co.
ATTORNEYS (No Model.) 3 Sheets—Sheet 3.

A. WARENSKJOLD & J. G. BURGESS.
RUNNING GEAR.

No. 496,712. Patented May 2, 1893.

WITNESSES:
Chas. Nida.
C. Sedgwick

INVENTORS
A. Warenskjold
BY J. G. Burgess
Munn & Co
ATTORNEYS.

UNITED STATES PATENT OFFICE.

AXEL WARENSKJOLD AND JOHN G. BURGESS, OF SAN DIEGO, CALIFORNIA.

RUNNING-GEAR.

SPECIFICATION forming part of Letters Patent No. 496,712, dated May 2, 1893.

Application filed December 28, 1891. Serial No. 416,387. (No model.)

*To all whom it may concern:*

Be it known that we, AXEL WARENSKJOLD and JOHN G. BURGESS, both of San Diego, in the county of San Diego and State of California, have invented a new and Improved Vehicle Running-Gear, of which the following is a full, clear, and exact description.

The invention relates to improvements in vehicle running gears such as shown and described in the Letters Patent No. 457,388, granted to us August 11, 1891.

The object of the present invention is to provide a new and improved running gear for vehicles, which is simple and durable in construction and arranged in such a manner as to permit of turning the vehicle in very short curves without binding the king bolt or other working parts.

The invention consists of a fifth wheel having two fulcrums.

The invention further consists of a fifth wheel pivoted to one of the axles, a second fifth wheel connected by two pivots with the other axle, and reaches crossing each other and connecting the axles with each other.

The invention also consists of certain parts and details and combinations of the same, as will be fully described hereinafter and then pointed out in the claims.

Reference is to be had to the accompanying drawings forming a part of this specification, in which similar letters of reference indicate corresponding parts in all the figures.

Figure 1:
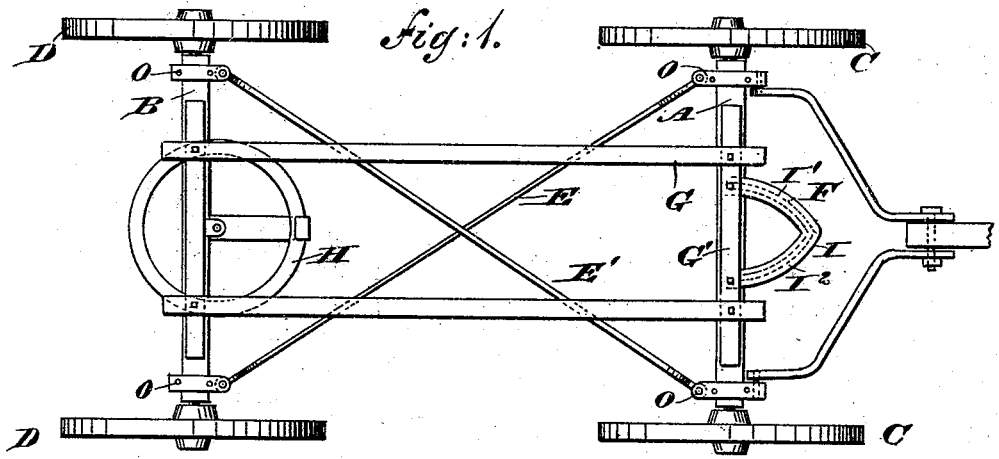
Figure 2:
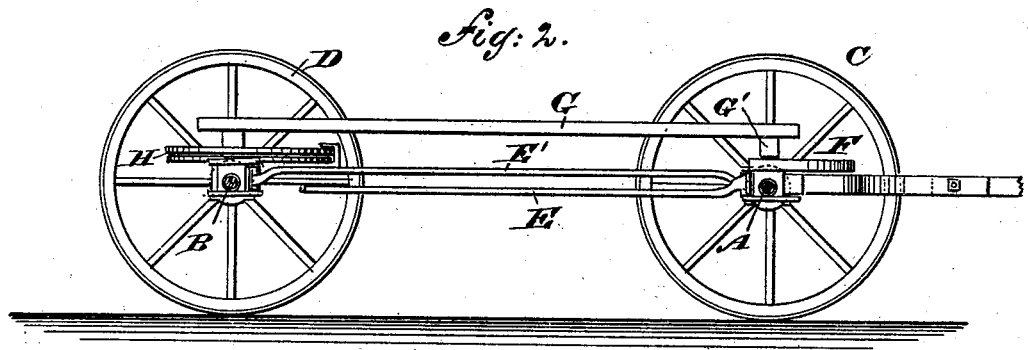
Figure 3:
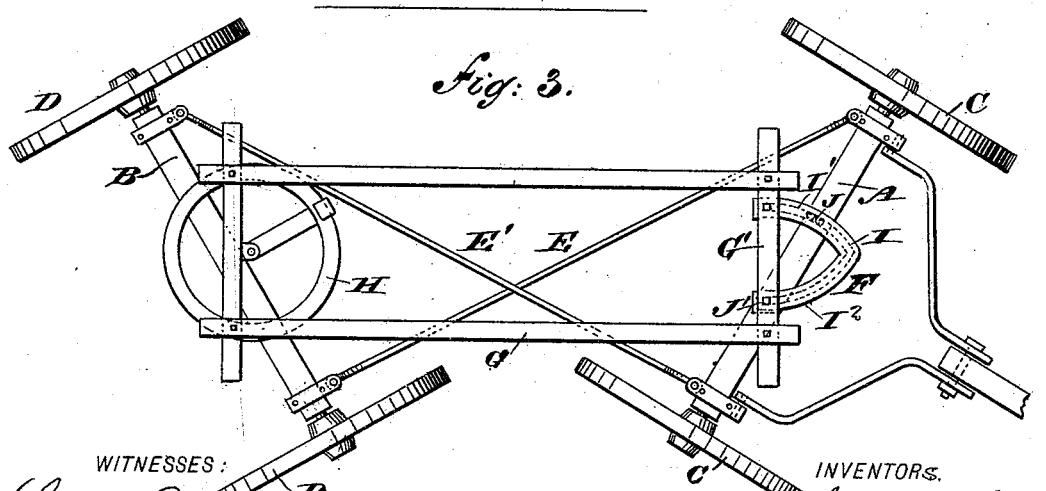
Figure 8:
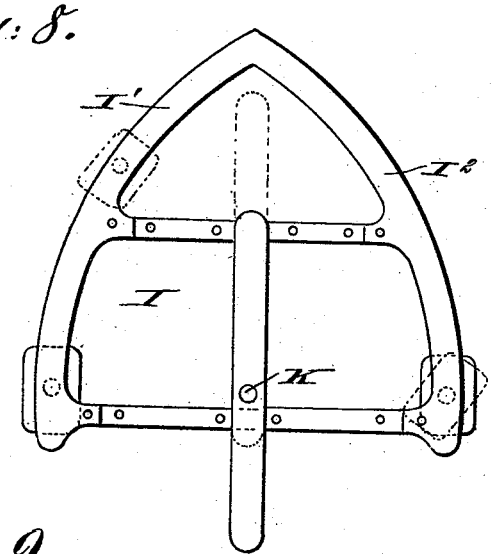
Figure 9:
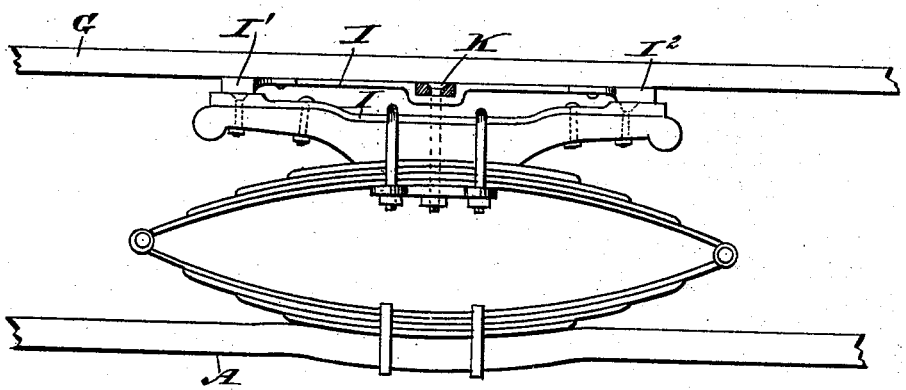

Figure 1 is a plan view of the improvement. Fig. 2 is a sectional side elevation of the same. Fig. 3 is a plan view of the same, showing the vehicle on a curve. Fig. 4 is an enlarged plan view of the fifth wheel for the front axle. Fig. 5 is an enlarged front view of the same as applied. Fig. 6 is a cross section of part of a modified form of the same. Fig. 7 is a like view of another modified form of the same. Fig. 8 is a plan view of another modified form of the same. Fig. 9 is a transverse section of the same. Fig. 10 is a plan view of another modified form of the fifth wheel for the front axle. Fig. 11 is a like view of the same in an open position. Fig. 12 is a plan view of the stop or rub iron as applied. Fig. 13 is an enlarged sectional plan view of the same. Fig. 14 is an enlarged sectional side elevation of one of the reaches and its connection with the axle. Fig. 15 is a plan view of a modified form of the axle; and Fig. 16 is a transverse section of the same on the line 16—16 in Fig. 15 showing the connection with the reach rod.

The vehicle on which the running gear is applied is provided with the usual front axle A and the rear axle B, carrying the front and rear wheels C and D, respectively. The front and rear axles A and B are connected with each other by the reaches E and E', extending diagonally, so as to cross each other at their middles. The front axle A is connected by a fifth wheel F with the wagon body G, and a fifth wheel H connects the rear axle B with the said wagon body.

The front fifth wheel F is made with two fulcrums, of which one is in use when turning the vehicle to one side and the other comes into play when the vehicle is turned in an opposite direction. This fifth wheel F is preferably in the shape illustrated in detail in Figs. 4 and 5, but may be modified as illustrated in Figs. 6 to 11 inclusive.

As illustrated in Figs. 4 and 5, the fifth wheel is provided with a plate I, made of two segmental sections I' and $I^2$, formed with segmental grooves $I^3$ and $I^4$, respectively, engaged by the heads of bolts J and J', respectively, secured to the axle A equidistant from the middle thereof. The plate I is secured by bolts or other means to the under side of the cross beam G' of the wagon body G, and the bottom of the said plate rests on top of the axle, as is plainly illustrated in the said Fig. 5.

When the axles A and B are parallel to each other, as is plainly illustrated in Figs. 1 and 2, then the bolts J stand at the inner ends of the grooves $I^3$ and $I^4$, and when the front axle A is turned to the right, as shown in Fig. 3, then the bolt J' is the fulcrum for the plate I to turn on, the other bolt J moving in the groove $I^3$ of the section I', as is plainly shown in the said Fig. 3. When the axle is turned to the left from the position shown in Fig. 1, the bolt J becomes the fulcrum as the other bolt J' moves in the groove $I^4$ of the section $I^2$. It will be seen that by this construction the wagon body G is not subjected to any strain when the vehicle is turned in either direction, as is the case in vehicles of the construction shown in the patent above mentioned.

It will be understood that when the two axles A and B are out of a parallel position, as shown for instance, in Fig. 3, the wagon body G assumes a natural position as it swings relative to the turning of the axles and consequently there is no strain whatever on any of the working parts connecting the front and rear axles at the fifth wheels F and H.

The fifth wheel H is of any approved construction, preferably comprising two disks, of which one is movable upon the other, one being secured to the axle B and the other to the wagon body.

In applying the modified construction of the front fifth wheel shown in Fig. 6, the plate I is attached to the axle A while the bolts J and J' are secured on the cross beam G' of the wagon body G. The operation, however, is the same as above described relative to Figs. 4 and 5. In applying the modified construction of said fifth wheel shown in Fig. 7, each of the bolts J is provided with a grooved head engaging a rail formed on the plate I, the said rail taking the place of the grooves $I^3$ and $I^4$ above mentioned, but being of the same segmental shape.

The plate I shown in Figs. 8 and 9, travels with its sections I' and $I^2$ upon bearings supported from the axle A, the king bolt K, however, having at its upper end a free longitudinal movement relative to the plate I, the said king bolt being for this purpose provided with a plate fitted to slide in a longitudinal slot or recess formed in the plate I, so that the wagon body G can assume a central position without binding on the king bolt when the front axle turns in either direction. When the axle turns in one direction, the bearings for the sections I', $I^2$, then stand in the position shown in dotted lines in Fig. 9.

As shown in Figs. 10 and 11, the front fifth wheel F is made in the shape of a double hinge, the two members L and L' of which are secured to the axle A and the cross beam G' of the wagon body G respectively. Now, it will be seen that when the axle A turns to the right, the two members L and L' swing from their connection at their right hand ends, and when the axle A swings in an opposite direction that is, to the left, the two members L and L' of the double hinge open from the left hand ends of the said members as a fulcrum.

The rub iron for the vehicle body is preferably made in the shape of a cone N, mounted to turn loosely on a shaft N' projecting from a rod $N^2$ secured at a convenient point to the vehicle body. The cone N is arranged horizontally and its sides are at such an inclination that when the axle A is turned to the extreme position as shown in Fig. 12, the two corresponding front and rear wheels rub at opposite sides of the said cone. As the cone N is mounted to turn, the two wheels can revolve, even when in contact with the rub iron, without producing much friction.

The two reaches E and E' are pivotally connected with the axles A and B, and in case the axles are made partly of iron and partly of wood, as shown in Fig. 14, then a clip O is employed attached to the axle and carrying the pivot pin $E^2$ engaging the respective head of the reach rod so that the latter can freely turn when the axle turns to one side.

It is understood that the ends of the heads of the reach rods are curved in opposite directions, to locate the reach rods a suitable distance one above the other to prevent them from coming in contact and binding on turning the vehicle.

In case the axle is made of iron only, then each axle is formed with two lugs A' carrying the pivot pin $E^2$ engaged by the forked end of the reach rod, as illustrated in Figs. 15 and 16.

It is understood that by making the front fifth wheel with two pivots, of which one is used at a time and the other forms a guide for the plate of the fifth wheel, the vehicle body is free to assume a natural position without binding any of the working parts.

Having thus described our invention, we claim as new and desire to secure by Letters Patent—

1. A vehicle running gear comprising a front and rear axle, wheels held thereon, diagonal reaches connecting the two axles with each other, and rub iron in the shape of a horizontally arranged cone having its base extending inwardly, and its sides adapted to be engaged by the corresponding front and rear wheels, substantially as shown and described.

2. A vehicle running gear comprising a front and rear axle, wheels held thereon, diagonal reaches connecting the two axles with each other, and rub iron in the shape of a horizontally arranged cone having its base extending inwardly, and its sides adapted to be engaged by the corresponding front and rear wheels, fifth wheels held on the front and rear axles, and a wagon body supported by the said fifth wheels and carrying the bearing for the said cone-shaped rub iron, substantially as shown and described.

AXEL WARENSKJOLD.
JOHN G. BURGESS.

Witnesses:
C. L. STANTON,
C. S. ANDERSON.